United States Patent [19]
Kageno et al.

[11] Patent Number: 4,812,540
[45] Date of Patent: Mar. 14, 1989

[54] PREPARATION OF POLYMERS OF MONOALLYLAMINE AND DIALLYLAMINE DERIVATIVES WITH AZO CATALYST

[75] Inventors: Kenji Kageno; Toshio Ueda; Susumu Harada, all of Koriyama,, Japan

[73] Assignee: Nitto Boseki Co., Ltd., Fukushima, Japan

[21] Appl. No.: 51,181

[22] Filed: May 12, 1987

Related U.S. Application Data

[63] Continuation of Ser. No. 854,059, Apr. 18, 1986, abandoned, which is a continuation of Ser. No. 662,998, Oct. 19, 1984, abandoned.

[30] Foreign Application Priority Data

Oct. 21, 1983 [JP]   Japan .................................. 58-197112

[51] Int. Cl.$^4$ ............................. C08F 2/16; C08F 2/14

[52] U.S. Cl. ................................. 526/218.1; 526/193; 526/204; 526/219; 526/219.1; 526/295; 526/310

[58] Field of Search ...................... 526/193, 204, 218.1, 526/219, 219.1

[56] References Cited

U.S. PATENT DOCUMENTS

4,504,640  3/1985  Harada ................................ 526/196

*Primary Examiner*—Christopher Henderson
*Attorney, Agent, or Firm*—Bert J. Lewen; Henry Sternberg

[57] ABSTRACT

A monoallylamine-diallylamine derivative copolymer with a high degree of polymerization can be obtained in a high yield by using a radical initiator containing an azo group and a group having cationic nitrogen atom in the molecule.

2 Claims, No Drawings

PREPARATION OF POLYMERS OF MONOALLYLAMINE AND DIALLYLAMINE DERIVATIVES WITH AZO CATALYST

This application is a continuation of U.S. patent application Ser. No. 854,059, filed Apr. 18, 1986, which in turn is a continuation of U.S. patent application Ser. No. 662,998, filed Oct. 19, 1984, both of which applications are now abandoned.

This invention relates to a process for the preparation of copolymers of monoallylamine and diallylamine derivatives.

As is well known, it is difficult to polymerize monoallyl compounds with an ordinary radical initiator, and generally no better result is obtained than the formation of a polymer with a low degree polymerization in a low yield. Copolymerization of said compounds with other well polymerizable vinyl monomers is equally difficult.

This is accounted for by the occurrence of a self-termination reaction which is induced by the reaction of allyl hydrogen atoms and the radical. Such termination reaction is usually referred to as allylic degradative chain transfer and discussed in many literatures (see, for instance, C. E. Schildknecht, "Allyl compounds and their polymers", Wiley Interscience, pp. 29–30, 1973, and R. C. Laible: Chem. Rev., 58 (5), 807–843, 1958). This holds true with monoallylamine which is a kind of monoallyl compound. Monoallylamine is hardly polymerized with an ordinary radical initiator, and regarding such polymerization of monoallylamine, there are available only a few reports including a method in which radiation polymerization is carried out by the use of gamma rays in a protonic acid (such as phosphoric acid, sulfuric acid or hydrochloric acid) (V. A. Kabanov et al, Vysokomol. Soed., 18, No. 9, 1957–1962, 1967, and 18, No. 10, 2233–2238, 1976). However, as is generally known, radiation polymerization method involves many problems for the mass production of polymers and can hardly be deemed an excellent method.

Polymonoallylamine is a very interesting type of polymer for practical use. Though monoallylamine has been industrially produced for a long time, no attempt has ever been made for the industrial production of polymonoallylamine which is a polymer of monoallylamine. The same is the case with the diallylamine derivatives. Except for the quaternary ammonium salt type diallylamine derivative monomers such as dimethyldiallylammonium chloride, there have been few attempts at the industrial production of the derivatives of secondary amines such as diallylamine and tertiary amines such as methyldiallylamine.

The present invention has for its object an industrially excellent process for the high-yield production of a copolymer with a high degree of polymerization from monoallylamine and a diallyamine derivative by using a radical initiator.

The present inventors have performed extensive research on a process capable of the high-yield production of the copolymer with a high degree of polymerization by conducting a radical polymerization of monoallylamine and a diallylamine derivative, both of which are poor in polymerizability as mentioned above, under conditions which are easy in industrial practice. As a result, it was found that an inorganic acid salt of monoallylamine and a diallylamine derivative monomer represented by the general formula:

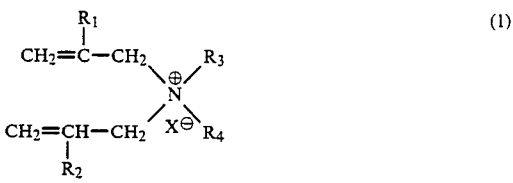

(wherein $R_1$ and $R_2$ are each hydrogen or a methyl group; $R_3$ and $R_4$ represent indepdendently hydrogen, a straight-chain or branched alkyl group having 1 to 5 carbon atoms, a benzyl group, a nuclear-substituted benzyl group, a cyclohexyl group or a hydroxyethyl group, or $N-R_3R_4$ forms a piperidine ring or a morpholine ring, and X represents Cl, Br, I, $NO_3$, $HSO_4$ or $H_2PO_4$) can be easily copolymerized in water or a polar solvent, or a mixture thereof, when using a radical initiator containing an azo group or a group having cationic nitrogen atom in the molecule, allowing the high-yield production of a high-polymerization-degree copolymer of said monoallylamine and diallylamine derivative. The present invention was completed on the basis of such finding.

The copolymer obtained according to the process of this invention is believed to have the following structural formula (2) or (3):

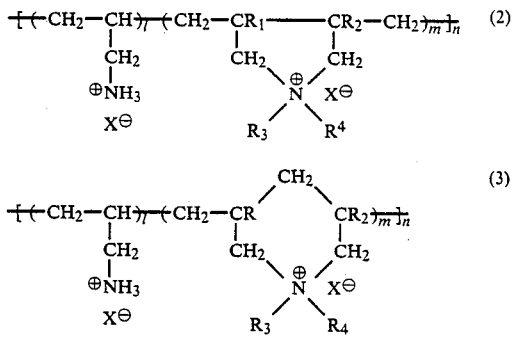

(wherein $R_1$, $R_2$, $R_3$, $R_4$ and X are as defined above, and l, m and n are each a positive integer showing the degree of polymerization).

No clear account is available for the reason why the polymerization advances easily and a copolymer with a high degree of polymerization can be obtained in a high yield when the allyl compounds with poor polymerizability are polymerized in water or a polar solvent or a mixture thereof by using a radical initiator containing an azo group and a group having cationic nitrogen atom in the molecule, but it is supposed that said achievement according to the process of this invention is attributable to the fact that both said monomers and initiator are electrically charged in the polymerization system. This supposition is supported by the fact that when the nonionic allyl compounds such as monoallyl alcohol, allyl cyanide, etc., are subjected to a polymerization treatment under the same conditions as said above, there scarcely takes place any polymerization of such compounds.

Some typical examples of the diallylamine derivatives represented by the general formula (1) are shown below:

Inorganic acid salts of secondary amines such as diallylamine hydrochloride; inorganic acid salts of thertiary amines such as methyldiallylamine hydrochloride, ethyldiallylamine hydrochloride, n-propyldiallylamine hydrochloride, iso-propyldiallylamine hydrochloride, n-butyldiallylamine hydrochloride, tert-butyldiallylamine hydrochloride, benzyldiallylamine hydrochloride and cyclohexyldiallylamine hydrochloride; and quaternary ammonium salts such as dimethyldiallylammonium chloride, diethyldiallylammonium chloride, di-n-propyldiallylammonium chloride, di-iso-propyldiallylammonium chloride, di-n-butyldiallylammonium chloride, methylethyldiallylammonium chloride, methylbenzyldiallylammonium chloride, diallylpiperidinium chloride and diallylmorpholinium chloride.

The process of this invention is described below.

The preferred examples of the inorganic acid salts of monoallylamine used in this invention are hydrochloride, sulfate, nitrate and phosphate. Such inorganic acid salt of monoallylamine is first dissolved in a solvent with a monomer of the general formula (1). Used as the solvent in this invention is a polar solvent, that is, water, an aqueous solution of an inorganic acid (such as hydrochloric acid, sulfuric acid, nitric acid, phosphoric acid, etc.), an organic acid (such as formic acid, acetic acid, propionic acid, etc.) or an aqueous solution thereof, alcohol, dimethyl sulfoxide, dimethylformamide and the like. When polymerizing said inorganic acid salt of monoallylamine and diallyalmine derivative of the general formula (1), both of them are usually used in the form of isolated crystals, but it is also possible to add monoallylamine and said diallylamine derivative alone with an inorganic acid into said polar solvent to produce a salt in the system. Needless to say, in case of using an aqueous solution of an inorganic acid as the polymerization medium, it is possible to carry out the polymerization by adding a predetermined amount of monoallylamine and a predetermined amount of diallyalmine derivative into an aqueous solution of a proper acid. The initial monomer concentration need not be specifically defined in this invention. It is however desirable that such initial monomer concentration be as high as possible within the range defined by the solubility of the monomer used, and in case of using water as solvent, said initial monomer concentration is preferably in the range of 50 to 85% by weight.

The initiator used as catalyst in this invention is a radical initiator containing an azo group and a group having cationic nitrogen atom in the molecule, but in view of ease of synthesis, there are preferably used the inorganic or organic acid salts such as hydrochloride sulfate, phosphate, alkylsulfate, para-toluenesulfonate, formate, acetate and propionate of azo compounds represented by the following general formula (4):

$$R_5 13 \; N=N-R_6 \tag{4}$$

(wherein at least one, preferably both of $R_5$ and $R_6$ are a group containing cationizable nitrogen atom selected form the group consisting of aminoalkyl, aminoaryl, amidinylalkyl, amidinylaryl, aminoalkaryl, aminoaralkyl, amidinylaralkyl, amidinylalkaryl, cyanoaminoalkyl and cyanoaminoalkaryl, and in case only one of $R_5$ and $R_6$ is a group containing cationizable nitrogen atom, the other is a group selected from the group consisting of alkyl, aryl, alkaryl, aralkyl, cyanoalkyl, cyanoaryl, cyanoalkaryl and cyanoaralkyl, $R_5$ and $R_6$ may form with an azo group a alkylene group represented by the following general formula (5):

(wherein $R_7$ is alkylene, alkylalkylene or arylalkylene, and Y is a group containing cationizable nitrogen atom)).

Among the initiator compounds represented by the general formula (4), the especially disirable ones are those having secondary or tertiary carbon atom adjacent to the azo group. The typical examples of such compounds are: 2,2'-diamidinyl-2,2'-azopropane hydrochloride, 2,2'-diamidinyl-2,2'-azobutane hydrochloride, 2,2'-diamidinyl-2,2'-azopentane hydrochloride, 2,2'-bis-(N-phenylamidinyl)-2,2'-azopropane hydrochloride, 2,2'-bis-(N-phenylamidinyl)-2,2'-azopropane hydrochloride, 2,2'-bis-(N-phenylamidinyl)-2,2'-azobutane hydrochloride, 2,2'-bis-(N,N-dimethylamidinyl-2,2'-azopropane hydrochloride, 2,2'-bis-(N,N-dimethylamidinyl)-2,2'-azobutane hydrochloride, 2,2'-bis-(N,N-diethylamidinyl)-2,2'-azopropane hydrochloride, 2,2'-bis-(N-n-butylamidinyl)-2,2'-azopropane hydrochloride, 2,2'-bis-(N-n-butylamidinyl)-2,2'-azobutane hydrochloride, 3,3'-bis-(N,N-di-n-butylamidinyl)-3,3'-azopentane hydrochloride, azobis-N,N'-dimethyleneisobutylamine hydrochloride.

2,2'-azobis-(2-methyl-4-diethylamino)-butylonitrile hydrochloride, 2,2'-azobis-(2-methyl-4-dimethylamino)-butylonitrile hydrochloride, 2,2'-azobis-(2-methyl-4-diethylamino)-butylonitrile hydrochloride, quaternary ammonium salt type azonitrile obtained by quaternizing 2,2'-azobis-(2-methyl-4-diethylamino)-4-butylonitrile or 2,2'-azobis-(2-methyl-4-dimethylamino)-butylonitrile with dimethylsulfuric acid or methyl p-toluenesulfonate.

3,5-diamidinyl-1,2-diazo-1-cyclopentene hydrochloride, 3-methyl-3,5-diamidinyl-1,2-diazo-1-cyclopentene hydrochloride, 3-ethyl-3,5-diamidinyl-1,2-cyclopentene hydrochloride, 3,6-diamidinyl-1,2-diazo-1-cyclohexene hydrochloride, 3-phenyl-3,5-diamidinyl-1,2-diazo-1-cyclopentene hydrochloride, 3,5-diphenyl-3,5-diamidinyl-1,2-diazo-1-cyclopentene hydrochloride, 3,5-diphenyl-3,5-diamidinyl-1,2-diazo-1-cyclopentene hydrochloride.

2,2'-azobis-(2-(imidazolynyl)propane) hydrochloride, 2,2'-azobis-(2-(imidazoynyl)butane) hydrochloride, and 2,2'-azobis-(2-(imidazolylnyl)-4-(methyl)-pentane) hydrochloride.

Said radical initiators containing an azo group and a group having cationic nitrogen atom are the known compounds, and their preparation processes and the examples of polymerization of unsaturated compounds by using these initiators are disclosed in U.S. Pat. Nos. 2,599,299, 2,599,300, 2,605,260 and 2,744,105. However, in the polymerization examples using said radical initiators disclosed in the above-mentioned U.S. Patents, the unsaturated compounds to be polymerized are the ones (such as ethylene, acrylonitrile, chlorobutadiene, etc.) which are different in chemical structure from monoallylamine and diallylamine derivatives used in the present invention. Therefore, these disclosures are not allusive to the inventive substance of the present invention.

The amount of the initiator added varies depending on the chemical structures and feed ratio of the inorganic acid salt of monoallylamine and the diallylamine derivative used, but usually said initiator is added in an amount of 0.2 to 10% by weight, preferably 1 to 5% by weight, based on the monomer.

The polymerization temperature is also variable depending on the chemical structure of the initiator used, but it is in the range of 30° to 100° C., usually 45° to 85° C.

The polymerization according to this invention is usually conducted in the air, but since the polymerization is somewhat affected by oxygen in the air, it is desirable, though not essential, to carry out the polymerization in an inert gas such as nitrogen. Also, the polymerization according to this invention can be conducted either in a stationary state or under stirring.

When using a radical initiator other than those used in this invention, it is possible to polymerize, to some extend, an inorganic acid salt of monoallylamine and a diallylamine derivative of the general formula (1) in a polar solvent, but as shown in the Comparative Examples given below, the polymerization degree and polymerization yield are both low in comparison with the process of this invention, and the results do not go beyond the range of the conventional conception that the allyl compounds are poor in polymerizability.

As described above, the present invention features the use of a radical initiator containing an azo group and a group having cationic nitrogen atom in the molecule for polymerizing an inorganic acid salt of monoallylamine and a diallylamine derivative in a polar solvent and is typified by the fact that, owing to the use of said radical initiator, said monomers can be copolymerized very easily in a desired ratio, allowiang obtainment of the desired copolymer with a high degree of polymerization in a high yield.

The process of this invention will be further described below in accordance with the examples thereof. In the examples shown below, the monoallylamine (hereinafter abbreviated as MAA) used as a starting material was the following preparation: MAA produced by Shell Chemical Co., U.S.A., was dried over granular sodium hydroxide and fractionated under nitrogen and the fraction with a boiling point of 52.5°–53.0° C. was used as said starting MAA. This fraction, as its gas chromatographic analysis showed, contained no diallylamine and triallylamine. As for the diallylamine (hereinafter abbreviated as DAA) used as another starting material in the examples shown below, DAA produced by Shell Chemical Co. was dried over granular sodium hydroxide and fractionated under nitrogen and the fraction with a boiling point of 111°–112° C. was used as starting DAA. The gas chromatographic analysis of this fraction showed that it contained no monoallylamine and triallylamine.

EXAMPLES 1–4 AND COMPARATIVE EXAMPLES 1–4

Here are shown the examples of preparation of copolymer in an aqueous solution of MAA hydrochloride (hereinafter referred to as MAA.HCl) and DAA hydrochloride (hereinafter referred to as DAA.HCl).

The monomers used in these examples were synthesized in the following ways. MAA.HCl was prepared by adding dropwise 571 g (10 mol) of MAA into 1.1 kg of concentrated hydrochloric acid (35% by weight) under stirring and ice cooling at 5°–20° C. and subjecting the reaction mixture to a concentration treatment under reduced pressure by using a rotary evaporator to remove water and and excess hydrogen chloride to thereby obtain a 75% by weight aqueous solution of MAA.HCl.

On the other hand, DAA.HCl was prepared by adding dropwise 972 g (10 mol) of DAA into 1.1 kg of concentrated hydrochloric acid (35% by weight) under stirring and ice cooling at 5°–30° C. and subjecting the reaction mixture to a concentration treatment under reduced pressure by using a rotary evaporator to remove water and excess hydrogen chloride to thereby obtain a 70 wt.% aqueous solution of MAA.HCl.

The thus synthesized monomers were fed into a separable flask equipped with a stirrer, a thermometer, a reflux condenser and a nitrogen inlet in the molar ratios shown in Table 1. Nitrogen gas was blown through the solution under heating at 65° C. to effect nitrogen substitution. Then 2,2'-diamidinyl-2,2'-azopropane hydrochloride in an amount of 2.5% by weight to the total weight of monomers was added in the form of a 15% by weight aqueous solution in five portions at intervals of about 3 hours. Generation of heat and foaming occured with the addition of the initiator and the solution became viscous gradually with the lapse of time. After the final addition of the initiator, the solution was heated to 75° C. and further stirred for about 3 hours to complete the polymerization.

The above treatment gave a light yellow and transparent viscous solution. A part of this polymerization solution was collected and reprecipitated with a large excess of acetone to obtain a white powdery polymer. This powdery polymer was filtered, washed with acetone and dried in vacuo, and the polymerization yield and intrinsic viscosity of the product were measured (in N/10NaCl at 30° C.). The polymerization conditions, yield and intrinsic viscosity are shown in Table 1.

By way of comparison, the polymerization was carried out by using as initiator a 25% by weight aqueous solution of ammonium persulfate in an amount of 3% by weight to the total weight of monomers (the initiators being added in six 0.5% by weight portions) under otherwise the same conditions as described above. The polymerization conditions, yield and intrinsic viscosity of the resulting products are also shown in Table 1 as Comparative Examples 1–4.

As seen from Table 1, in Examples 1–4 of this invention where 2,2'-diamidinyl-2,2'-azopropane hydrochloride was used as polymerization initiator, there could be obtained the desired polymer with a higher degree of polymerization and in a higher yield in any MAA.HCl molar ratio than the polymers obtained in Comparative Examples 1–4 where ammonium persulfate (APS) was used as initiator.

TABLE 1

| | MAA.HCl/DAA.HCl (mol ratio) | Monomer concentration (wt. %) | Initiator (wt. %) | Intrinsic viscosity (30° C. in N/10-NaCl) | Yield (wt. %) |
| --- | --- | --- | --- | --- | --- |
| Example 1 | 0.9/0.1 | 74.3 | 2.5 | 0.36 | 100 |
| Example 2 | 0.8/0.2 | 73.6 | 2.5 | 0.42 | 100 |
| Example 3 | 0.5/0.5 | 72.0 | 2.5 | 0.59 | 100 |

TABLE 1-continued

| | MAA.HCl/DAA.HCl (mol ratio) | Monomer concentration (wt. %) | Initiator (wt. %) | Intrinsic viscosity (30° C. in N/10-NaCl) | Yield (wt. %) |
|---|---|---|---|---|---|
| Example 4 | 0.33/0.67 | 71.2 | 2.5 | 0.89 | 100 |
| Comp. Example 1 | 0.9/0.1 | 74.3 | 3 (APS) | 0.15 | 47.6 |
| Comp. Example 2 | 0.8/0.2 | 73.6 | 3 (APS) | 0.18 | 59.1 |
| Comp. Example 3 | 0.5/0.5 | 72.0 | 3 (APS) | 0.25 | 82.7 |
| Comp. Example 4 | 0.33/0.67 | 71.2 | 3 (APS) | 0.29 | 97.5 |

EXAMPLE 5 AND COMPARATIVE EXAMPLE 5

Shown here are the examples of preparation of copolymer in an aqueous solution of MAA.HCl and methyldiallylamine hydrochloride (hereinafter referred to as MDAA.HCl).

Of the monomers used in the present examples, MAA.HCl was synthesized in the manner described in Examples 1-4 while MDAA.HCl was synthesized in the following way: 1,112 g (10 mol) of methyldiallylamine was added dropwise into 1.1 kg of concentrated hydrochloric acid (35% by weight) under stirring and ice cooling at 5°-30° C. and the reaction mixture was subjected to a concentration treatment by using a rotary evaporator to remove water and excess hydrogen chloride, thereby obtaining a 75% by weight aqueous solution of DMAA.HCl.

The thus obtained monomers were polymerized by using the same polymerization apparatus under the same polymerization conditions as used in Examples 1-4 and further subjected to the same treatment as in Examples 1-4 to obtain a yellowish white powdery copolymer. A part of this copolymer product was sampled and its yield and intrinsic viscosity (in N/10NaCl at 30° C.) were determined.

The polymerization conditions, yield and intrinsic viscosity are shown in Table 2.

By way of comparison, the polymerization was conducted by using ammonium persulfate (APS) as polymerization initiator under otherwise the same conditions as said above, the results being also shown in Table 2 under Comparative Example 5.

As seen from Table 2, Example 5 where 2,2'-diamidinyl-2,2'-azopropane hydrochloride was used as polymerization initiator shows higher yield and intrinisic viscosity than Comparative Example 5 where APS was used as polymerization initiator.

EXAMPLES 6-7 AND COMPARATIVE EXAMPLES 6-7

Copolymer preparation in an aqueous solution of MAA.HCl and dimethyldiallylammonium chloride (abbreviated hereinafter as DMDAAmCl) is described here.

Of the monomers used in the present examples, MAA.HCl was synthesized according to the method of Examples 1-4. DMDAAmCl was synthesized in the following way. 902 g (10 mol) of a 50% aqueous solution of dimethylamine was fed into a separable flask equipped with a stirrer, a thermometer, a dropping funnel and a reflux condenser, and then 1,531 g (20 mol) of allyl chloride was added thereto under stirring from the dropping funnel over a period of 7 hours. 1.5 hour after the start of dropwise addition of allyl chloride, 800 g (10 mol) of a 50% aqueous solution of sodium hydroxide was added from the dropping funnel over a period of 5.5 hours. The temperature was maintained at 30° C. for the first 5-hour period and then gradually raised still reaching 45° C. at the termination of the dropwise addition. Thereafter the temperature was further raised to 50° C. and the reaction was carried out at this temperature for 10 hours. The reaction mixture was subjected to a concentration treatment with a rotary evaporator, and water and precipitated sodium chloride were filtered out to obtain a 65% aqueous solution of DMDAAmCl.

The thus obtained monomers were polymerized by using the same polymerization apparatus under the same polymerization conditions as in Examples 1-4. The polymerization conditions, yield and intrinsic viscosity of the product are shown in Table 3.

For comparison, said polymerization was conducted by using APS as polymerization initiator under otherwise the same conditions as described above, obtaining the results also shown in Table 3, under Comparative Examples 6-7. The yield is the value obtained after correcting the content of sodium chloride in DMDAAmCl.

Table 3 shows that in case of using 2,2'-diamidinyl-2,2'-azopropane hydrochloride as polymerization initiator, there can be obtained the desired copolymer with a higher degree of polymerization in a higher yield than when using APS as polymerization initiator as in Comparative Examples 6-7.

TABLE 2

| | MAA.HCl/MDAA.HCl (mol ratio) | Monomer concentration (wt. %) | Initiator (wt. %) | Intrinsic viscosity (30° C. in N/10-NaCl) | Yield (wt. %) |
|---|---|---|---|---|---|
| Example 5 | 0.5/0.5 | 75 | 2.5 | 0.48 | 100 |
| Comp. Example 5 | 0.5/0.5 | 75 | 3 (APS) | 0.20 | 71.8 |

TABLE 3

|  | MAA.HCl/DMDAAmCl (mol ratio) | Monomer concentration (wt. %) | Initiator (wt. %) | Intrinsic viscosity (30° C. in N/10-NaCl) | Yield (wt. %) |
|---|---|---|---|---|---|
| Example 6 | 0.5/0.5 | 68.3 | 2.5 | 0.47 | 100 |
| Example 7 | 0.3/0.7 | 66.8 | 2.5 | 0.62 | 100 |
| Comp. Example 6 | 0.5/0.5 | 68.3 | 3 (APS) | 0.18 | 83.4 |
| Comp. Example 7 | 0.3/0.7 | 66.8 | 3 (APS) | 0.24 | 92.1 |

EXAMPLES 8–10 AND COMPARATIVE EXAMPLES 8–10

Treated herein are the preparation examples of copolymers in an aqueous solution of monoallylamine phosphate (hereinafter referred to as $MAA.H_3PO_4$) and diallylamine phosphate (hereinafter referred to as $DAA.H_3OP_4$), methyldiallylamine (hereinafter referred to as $MDAA.H_3PO_4$) or DMDAAmCl.

The monomers used in the present examples were synthesized in the following ways. For preparing $MAA.H_3PO_4$, 571 g (10 mol) of MAA was added dropwise with care into a mixed solution of 1,153 g (10 mol) of concentrated phosphoric acid (85% by weight) and 861 g of water under stirring. In the course of the reaction, white crystals of $MAA.H_3PO_4$ separated out and the whole reaction system became a slurry, making it hard conduct stirring and cooling. After the dropwise addition, the slurry-like solution was heated at 50°–55° C. and further stirred for about one hour to obtain a colorless and transparent viscous 60% aqueous solution of $MAA.H_3PO_4$.

$DAA.H_3PO_4$ was prepared by adding dropwise 972 g (10 mol) of DAA into a mixed solution of 1,153 g (10 mol) of concentrated phosphoric acid (85% by weight) and 878 g of water under stirring and ice cooling at 10°–30° C., heating the reaction mixture at 50°–55° C. and stirring it for about one hour to obtain a light-yellow transparent 65% aqueous solution of $DAA.H_3PO_4$.

$MDAA.H_3PO_4$ was prepared by adding dropwise 1,112 g (10 mol) of MDAA into a mixed solution of 1,153 g (10 mol) of concentrated phosphoric acid (85% by weight) and 954 g of water under stirring and ice cooling at 10°–30° C., heating the reaction mixture at 50°–55° C. and stirring it for about one hour to obtan yellow transparent 65% aqueous solution of $MDAA.H_3PO_4$.

DMDAAmCl was synthesized by the method used in Examples 6–7.

The thus synthesized monomers were polymerized by using the same polymerization apparatus and under the same polymerization conditions as explained in Examples 1–4 and further subjected to the same treatment as in Examples 1–4. The resulting copolymers were sampled and their yield and intrinsic vissocisty were determined.

The polymerization conditions, yield and intrinsic viscosity are shown in Table 4. For the purpose of comparison, the polymerization was carried out by using APS as polymerization initiator under otherwise the same conditions. The polymerization conditions, yield and intrinsic viscosity in these comparative examples (Comparative Examples 8–10) are also shown in Table 4.

As seen from Table 4, use of 2,2'-diamidinyl-2,2'-azopropane hydrochloride as polymerization initiator, in case of using phosphates as monomers, can provide higher yield and a higher intrinsic viscosity than when using APS as polymerization initiator.

TABLE 4

|  | Copolymerization monomers (mol ratio) | Monomer concentration (wt. %) | Initiator (wt. %) | Intrinsic viscosity (30° C., in N/10 NaCl) | Yield (wt. %) |
|---|---|---|---|---|---|
| Example 8 | $MAA.H_3PO_4/DAA.H_3PO_4$ (0.5/0.5) | 62.7 | 2.5 | 0.62 | 100 |
| Example 9 | $MAA.H_3PO_4/MDAA.H_3PO_4$ (0.5/0.5) | 62.8 | 2.5 | 0.48 | 100 |
| Example 10 | $MAA.H_3PO_4/DMDAAmCl$ (0.5/0.5) | 62.3 | 2.5 | 0.35 | 100 |
| Comp. Example 8 | $MAA.H_3PO_4/DAA.H_3PO_4$ (0.5/0.5) | 62.7 | 3 | 0.32 | 78.1 |
| Comp. Example 9 | $MAA.H_3PO_4/MDAA.H_3PO_4$ (0.5/0.5) | 62.8 | 3 | 0.17 | 67.6 |
| Comp. Example 10 | $MAA.H_3PO_4/DMDAAmCl$ (0.5/0.5) | 62.3 | 3 | 0.05 | 87.8 |

EXAMPLE 11

The polymerization was carried out in the same way as Examples 1 except for use of 2,2'-bis-(N-phenylamidinyl)-2,2'-azopropane hydrochloride in place of 2,2'-diamidinyl-2,2'-azopropane hydrochloride as polymerization initiator. By following the same ensuing treatment as in Examples 1–4, there was obtained a white powdery copolymer.

The yield was 100% and the intrinsic viscosity (at 30° C. in N/10NaCl) was 0.61.

EXAMPLE 12

The polymerization was carried out according to the process of Examples 1–10 except for use of 2,2'-azobis-(2-(imidazolynyl)propane) hydrochloride in palce of 2,2'-diamidinyl-2,2'-azopropane hydrochloride as polymerization initiator, and thereafter the same operations as in Examples 1–4 were repeated to obtain a white powdery copolymer.

The yield was 98.2% and the intrinsic viscosity (at 30° C. in N/10NaCl) was 0.63.

What is claimed is:

1. A process for preparing a copolymer which comprises: copolymerizing monoallylamine hydrochloride and diallylamine hydrochloride in a ratio of from 9:1 to 0.5:1 in water in the presence of from 0.1 to 10%, based on monomer, of 2,2'-diamidinyl-2,2'-azopropane hydrochloride at a temperature of from 30° to 100° C.

2. A process for preparing a copolymer of monoallylamine and a diallylamine derivative, which comprises copolymerizing an inorganic acid salt of a monoallylamine and a diallylamine derivative monomer in a molar ratio of from 9:1 to 3:7, wherein said diallylamine derivative monomer is represented by the general formula:

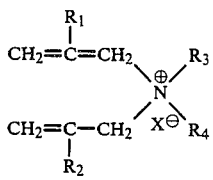
(1)

wherein $R_1$ and $R_2$ are each hydrogen or a methyl group, $R_3$ and $R_4$ represent independently hydrogen, a straight-chain or branched alkyl group having 1 to 5 carbon atoms, a benzyl group, a nuclear substituted benzyl group, a cyclohexyl group or a hydroxyethyl group, or $N-R_3.R_4$ represents a piperidine or morpholine ring, and X represents Cl, Br, I, $NO_3$, $HSO_4$ or $H_2PO_4$ in water or a polar solvent, or a mixture thereof, in the presence of from 0.1 to 10%, based on monomer, of a radical initiator at a temperature of from 30° to 100° C., wherein said radical initiator is an inorganic or organic acid salt selected from the group consisting of hydrochloride, sulfate, phosphate, alkylsulfate, paratoluenesulfate, formate, acetate and propionate of an azo compound represented by the general formula (4):

$$R_5-N=N-R_6 \qquad (4)$$

wherein both $R_5$ and $R_6$ are each a group containing cationizable nitrogen atom selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl and cyanoaminoalkaryl; or only one of $R_5$ and $R_6$ is a group containing cationizable nitrogen atom and the other is a group selected from the group consisting of alkyl, aryl, alkaryl, aralkyl, cyanoalkyl, cyanoaryl, cyanoalkaryl and cyanoaralkyl; or $R_5$ and $R_6$ form with an azo group a group represented by the following general formula (5):

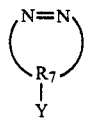
(5)

wherein $R_7$ represents alkylene, alkylalkylene or aralkylene, and Y is a group containing cationizable nitrogen atom.

* * * * *